US012442520B1

(12) United States Patent
Wegner et al.

(10) Patent No.: US 12,442,520 B1
(45) Date of Patent: *Oct. 14, 2025

(54) HOUSING EXTENSION DEVICE AND SYSTEM

(71) Applicant: Fraser Oaks, Inc., El Segundo, CA (US)

(72) Inventors: Wesley Gene Wegner, Carson City, NV (US); Paul Brett Wegner, El Segundo, CA (US)

(73) Assignee: FRASER OAKS, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,483

(22) Filed: May 20, 2024

Related U.S. Application Data

(63) Continuation of application No. 18/118,276, filed on Mar. 7, 2023, now Pat. No. 11,988,365.

(60) Provisional application No. 63/317,484, filed on Mar. 7, 2022.

(51) Int. Cl.
*F21V 21/14* (2006.01)
*F21S 8/02* (2006.01)

(52) U.S. Cl.
CPC ................ *F21V 21/14* (2013.01); *F21S 8/02* (2013.01)

(58) Field of Classification Search
CPC ................................ F21S 8/028; F21V 21/14
See application file for complete search history.

(56) References Cited

U.S. PATENT DOCUMENTS

2013/0327586 A1* 12/2013 Tanaka .................. H04R 1/026 181/199
2018/0224095 A1 8/2018 Cohen

* cited by examiner

*Primary Examiner* — Sean P Gramling
(74) *Attorney, Agent, or Firm* — Command IP LLP; Pejman Yedidsion

(57) ABSTRACT

Systems, devices, and methods for a housing extension for lighting. A system embodiment may include: a primary housing, a first adjusting bracket attached to the primary housing, a second adjusting bracket, an adjustment screw inserted into both the first adjusting bracket and the second adjusting bracket, and an electrical component disposed within the primary housing.

15 Claims, 23 Drawing Sheets

HOUSING EXTENSION DEVICE AND SYSTEM

CROSS-REFERENCE TO RELATED APPLICATIONS

This application is a continuation of U.S. Non-Provisional patent application Ser. No. 18/118,276, filed Mar. 7, 2023, which claims priority to and the benefit of U.S. Provisional Patent Application No. 63/317,484, filed Mar. 7, 2022, the contents of all of which are hereby incorporated by reference herein for all purposes.

TECHNICAL FIELD

Embodiments relate generally to electrical equipment, for example, lighting fixtures and housing extensions for lighting, luminaires, and other components.

BACKGROUND

When buildings are renovated or restored or otherwise modified from their original surfaces, it is common for renovators to lay down new sheet stock such as sheet rock, paneling, and the like, over the existing components. This process of layering causes the existing component housing and other fixtures to become recessed within the built-up wall by the thickness of the new sheet stock.

SUMMARY

A system embodiment may include: a primary housing, a first adjusting bracket attached to the primary housing, a second adjusting bracket, an adjusting mechanism inserted into both the first adjusting bracket and the second adjusting bracket, and a lighting, or other components disposed within the primary housing.

In additional system embodiments, the primary housing may include: an electrical component housing holding the component. In additional system embodiments, the component housing may be detachable form the primary housing. In additional system embodiments, the second adjusting bracket may be a housing adjusting bracket. In additional system embodiments, the second adjusting bracket may be a component adjustment bracket. In additional system embodiments, the second adjusting bracket may be a flange adjustment bracket. In additional system embodiments, the system may further include an external power supply. In additional system embodiments, the system may further include an auxiliary bracket.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Embodiments of a housing extension device and system are configured to provide an extension mechanism to a housing assembly when additional surface layers of an original surface has been installed. It is common for unknown materials such as tile, brick, or other ceiling coverings, to be installed over an original surface which may alter the original intent of the surface. When this occurs, original housing assembly components such as screws, lips, flanges, and screw holes become recessed within a wall. The disclosed housing extension may therefore allow variation to the installed assembly when the surface of the assembly has been modified with an unknown material altering the original intent of the housing. The disclosed housing extension allows variation in surface layers to be installed providing an adjusting mechanism. The disclosed housing extension provides extension and adjustment for fixtures such as lighting, luminaires, components, or other fixtures recessed within a mounting surface. Adjustment mechanisms may include screws, actuators, or the like.

The extending member, or sliding tubular member, is an attachable or otherwise adjustable element of an assembly comprised of the extending member, a surface of the assembly, and a bracket. A first embodiment has at least one mounting bracket or, for example, two brackets placed within a housing. One bracket is placed at the base of the housing and extends into the open portion of the housing. The second bracket is preferably placed proximate to the base of the extending member to maximize adjustment management of extending member travel. An alternative embodiment has the second bracket within the base and top of the extending member. Each bracket has an entry for an adjusting mechanism. By turning the adjusting mechanism, the extension is elevated or lowered such that the outer edge of the extension is made substantially flush with the mounting surface. Additional sets of mounting brackets may be required depending primarily upon the number of housings and housing size.

Figure 1:
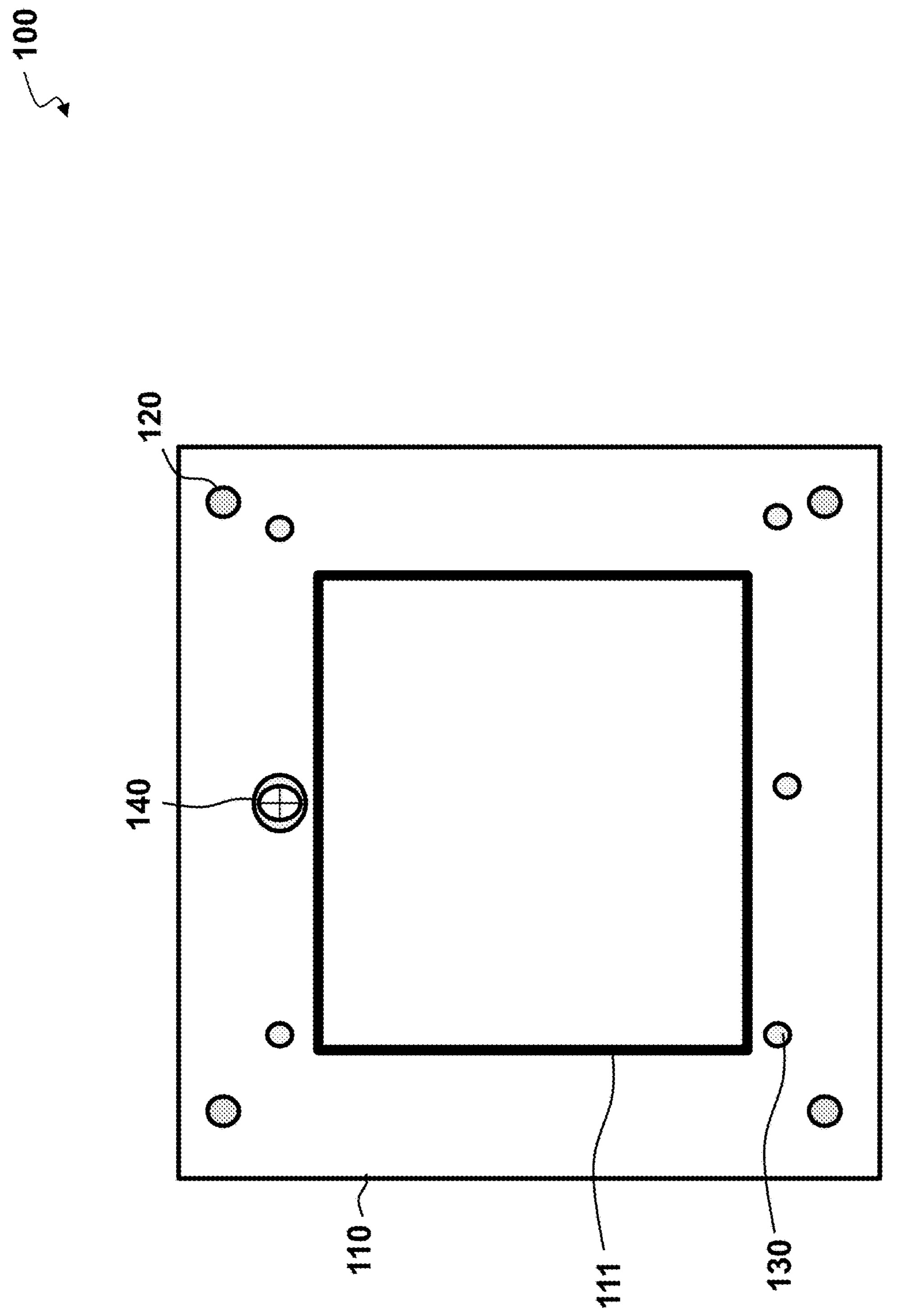
FIG. 1 depicts the present system having a flange with multiple adjustment openings, according to an embodiment of the present disclosure.

FIG. 1 depicts the present system having a flange with multiple adjustment openings 100, according to an embodiment of the present disclosure. System 100 includes flange 110 which provides a parallel plane to a working surface, plate holes 120 which allow flange 110 to be fixed in a desired height, a first set of adjustment screws 130 which are configured to adjust flange 110 height, a set of adjustment screws 140 configured to further adjust the flange 110 surface height, and a flange inner wall 111 which provides an enclosure within the system 100. In one embodiment, for example a trimlight system, the plate holes 120 may be adjusted up and down which may also move the light and light housing. That is, the system may be configured to not be fixed to the body. The adjusting parts, adjustment screw sets 130, 140 move in/out thru center gap in the flange. For example, there is a body that has the power and electrical lines and within this body there is the light which is in a housing within a flange. The plate holes 120 are configured to allow the complete assembly to be held to the body instead of using other retention options.

For example, plate holes 120 may be configured as design for such working surfaces including paste materials, drywall mud, stucco, plaster, etc. Plate holes 120 provide securing points where a screw may secure system 100 to various unstable materials.

In one embodiment, the first set of adjustment screws 130 include one or more screws provided at various locations throughout a surface of the flange 110 configured to provide a substantially vertical or flush plane with a working surface.

In one embodiment, the second set of adjustment screws 140 include one or more screws provided at various locations throughout a surface of the flange 110 configured to provide a substantially vertical or flush plane with a working surface.

In another embodiment, the second set of adjustment screws 140 may be configured to provide a tilt to a flange 110 further providing control of the variable height surface. In yet another embodiment, a second set of adjustment screws 140 may include a locking mechanism which ensures that the flange 110 surface is fixed at a desired height.

Figure 2:
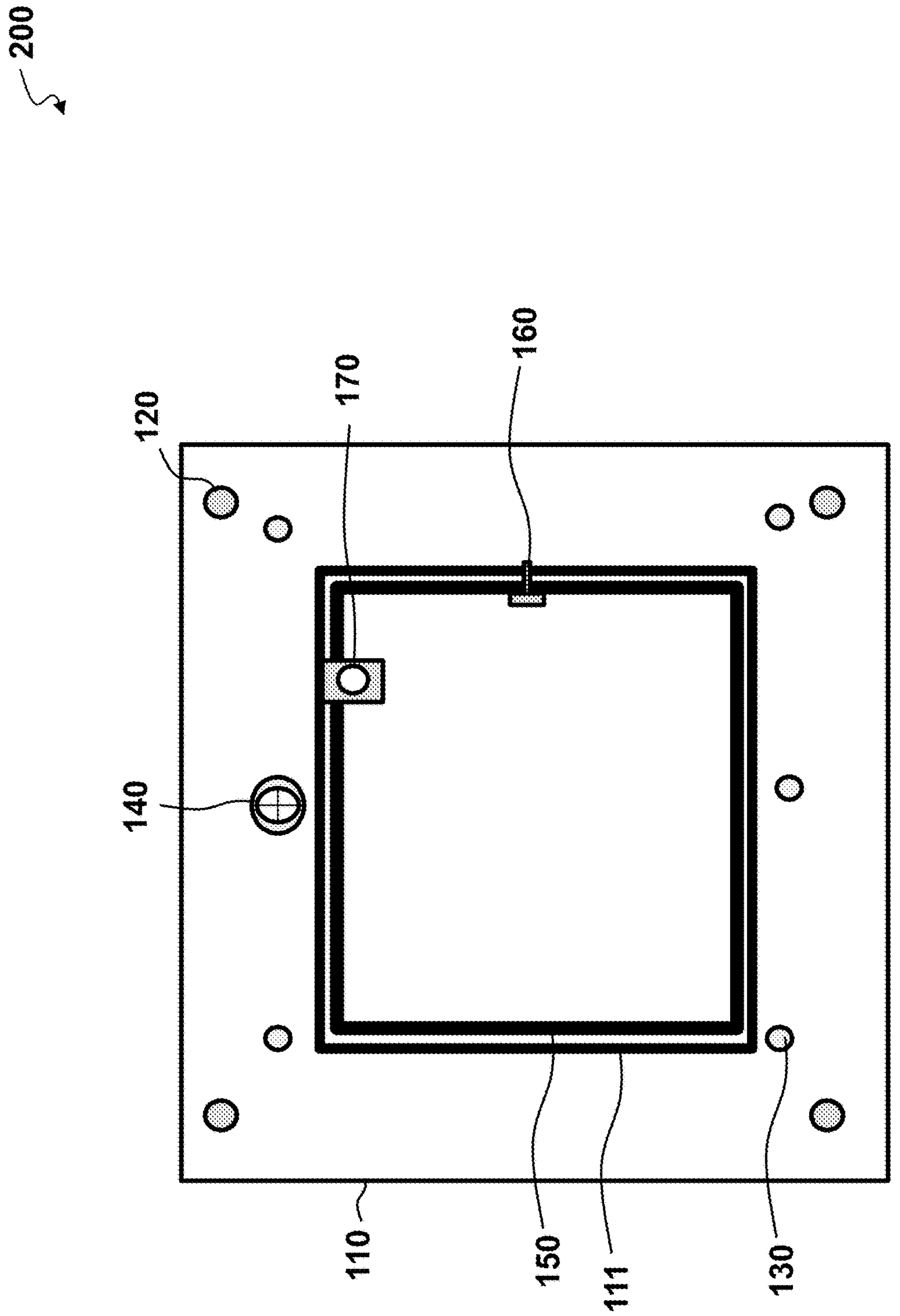
FIG. 2 depicts the present system having a flange with multiple adjustment openings depicted in FIG. 1, including a component compartment, according to an embodiment of the present disclosure.

FIG. 2 depicts the present system having a flange with multiple adjustment openings as depicted in FIG. 1 including a component compartment 200, according to an embodiment of the present disclosure. System 200 as described in FIG. 1 may include flange 110, one or more plate holding screws 120, a first set of adjustment screws 130, a second set of adjustment screws 140, and a flange inner wall 111. The present system 200 may further include a component housing 150 which provides an additional removable surface to an inner enclosure. Component housing 150 may be attached to the flange inner wall 111 via an attachment fastener 160 fastened normally through the component housing 150 wall affixing the attachment fastener 160 to the flange inner wall 111, and a component bracket 170, which may provide a surface for additional components to be affixed to the present system.

In some embodiments, one or more attachment fasteners 160 may be included, and configured to provide additional stability to the component housing 150. In other embodiments, attachment fastener 160 may include a tightening screw, while in other embodiments a clip or removable component may be used. Yet in other embodiments, one or more component brackets 170 may be included providing additional attachment opportunities on system 200.

Figure 3:
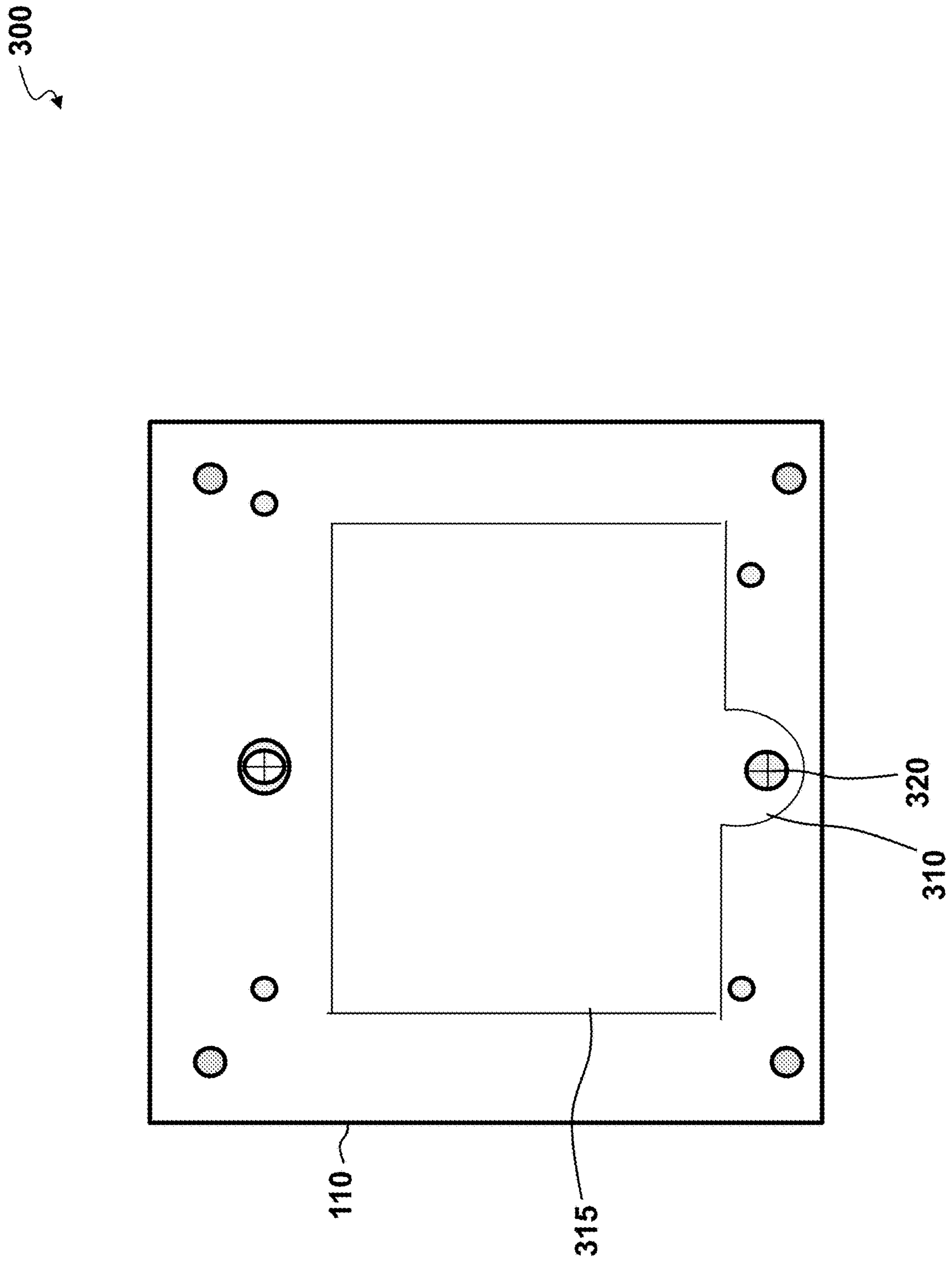
FIG. 3 depicts the present system having a flange with a panel, according to an embodiment of the disclosure.

FIG. 3 depicts the present system having a flange with a panel, according to an embodiment of the disclosure. The system 300 may include a flange 110 of system 100 and further includes a panel 315 configured to securely cover a component housing 150 opening, a panel tab 310 configured to provide an extended lip of panel 315 over a flange surface 110, and a fastener 320 which may be configured to secure the panel 315 to system 100 via a flange 110 surface.

In some embodiments, one or more panel tabs 310 may be included to provide additional opportunities to secure the panel 315 to system 100 (see FIG. 1). In other embodiments, panel tab 310 may extend beyond a flange surface 110 where a fastener 320 may secure the panel 315 to system 100.

Figure 4:
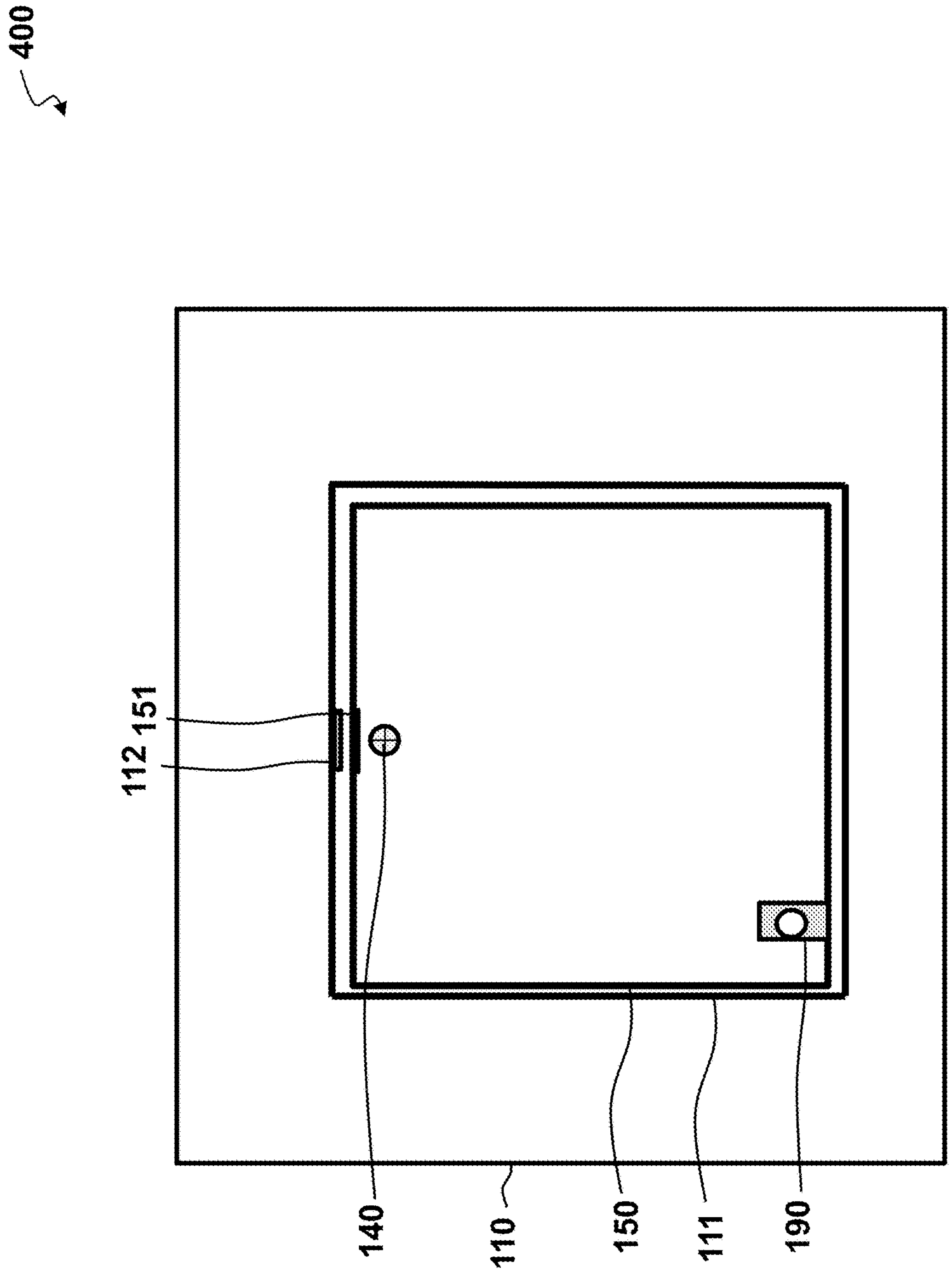
FIG. 4 depicts the present system having a flange with multiple adjustment openings and a lighting, compartment, and without a retaining fastener, according to an embodiment of the present disclosure.

FIG. 4 depicts the present system depicted in FIG. 1 having a flange with multiple adjustment openings and a component housing, and without a retaining fastener 400, according to an embodiment of the present disclosure. The present system 100 may include a flange 110, component housing 150, attached to the flange inner wall 111, a flange adjustment bracket 112, a light housing adjusting bracket 151, 112, and second set of adjustment screw 140. The flange 110 may further include an auxiliary bracket 190 which in some embodiments may provide an optional location for a bracket assembly (not shown). In this system embodiment, both the flange and the light housing brackets may be adjusted. The flange adjustment bracket 112 may be the flange adjustment mechanism and 151 is the light housing adjustment mechanism. The auxiliary bracket 190 may be a spare bracket which may be used for other connected components. Some examples may be ground wire attachment, light switch attachment bracket, electrical plug attachment bracket, etc.

Figure 5:
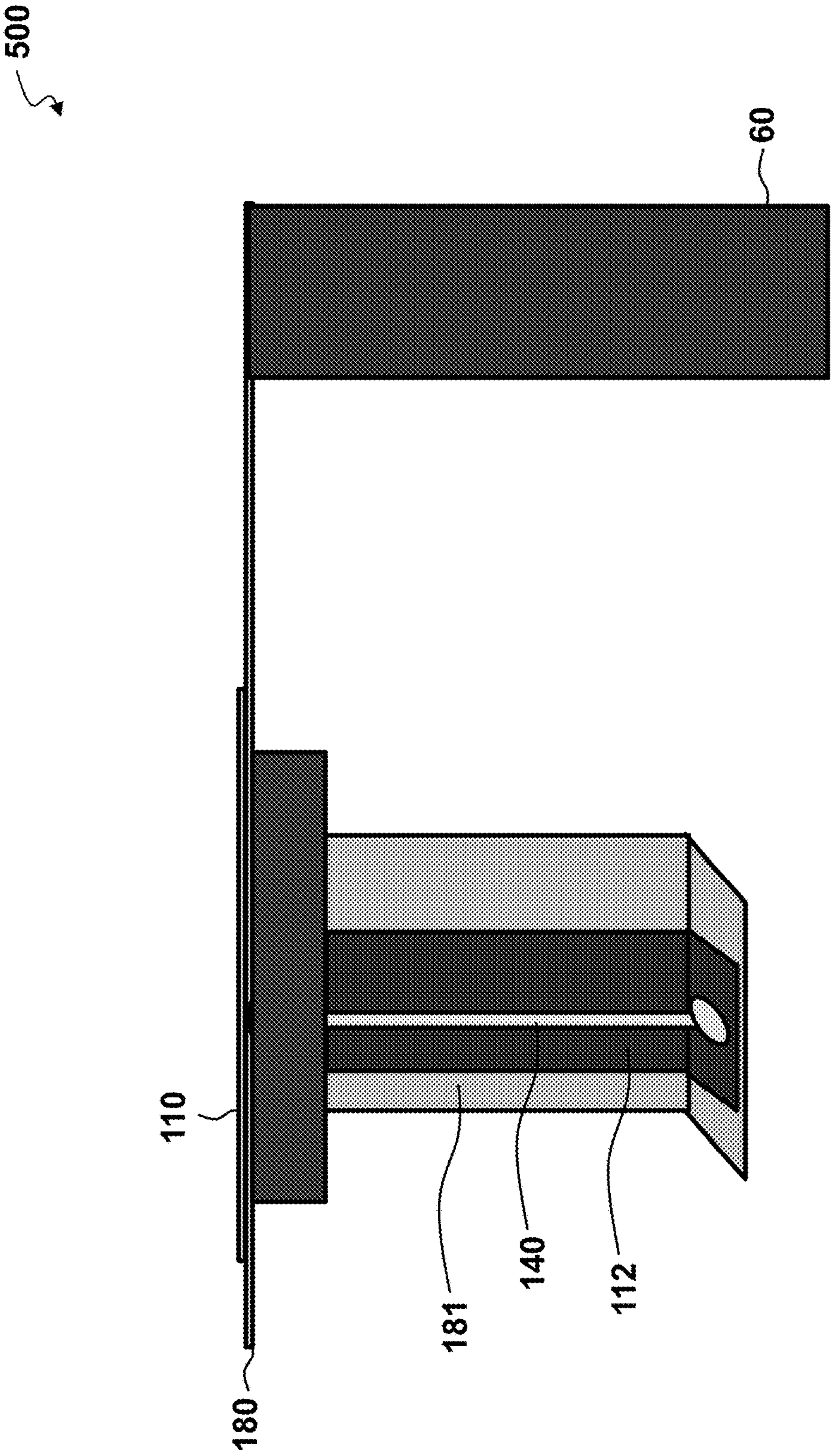
FIG. 5 is a diagram depicting the present system with an adjustment mechanism according to an embodiment of the present disclosure.

FIG. 5 is a diagram depicting the present system 100 depicted in FIG. 1 with one or more second adjustment mechanisms 500, according to an embodiment of the present disclosure. System 500 provides a horizontal transparent view of system 100 which includes a second set of adjustment screws 140 which as depicted may be inserted into a flange adjusting bracket 112, a base plate adjusting bracket 181 which provides an additional surface where a second set of adjustment screws 140 may be inserted into, a base plate 180 providing a structural surface for screws 120, 130, and 140, flange 110, and a power supply 60 which provides an illustration of how power to the present system may be provided for required elements.

For example, the system 500 may reduce or increase a distance to a working surface, flange and base plate adjustment brackets 112 and 181, may be adjusted using a second set of adjustment screw 140 which is inserted through a flange 110 surface and into both the flange adjustment bracket 112 and base plate adjustment bracket 181. That is, by use of the second set of adjustment screw 140, a flange 110 surface may be adjusted.

In other embodiments, additional adjustment screws such a first set of adjustment screws 130 may further be used to adjust the flange 110 surface. In other embodiments, the first set of adjustment screws 130 and second set of adjustment screws 140 may be adjusted in conjunction in order to ensure flange 110 is flush with a working surface. For example, due to uneven surfaces, patchwork, and poor craftsmanship, working surfaces may not be completely flat or vertical. In such a case a flange 110 may require uneven adjustment of first and second set of adjustment screws 130 and 140 to provide different flange 110 adjustments.

Figure 6:
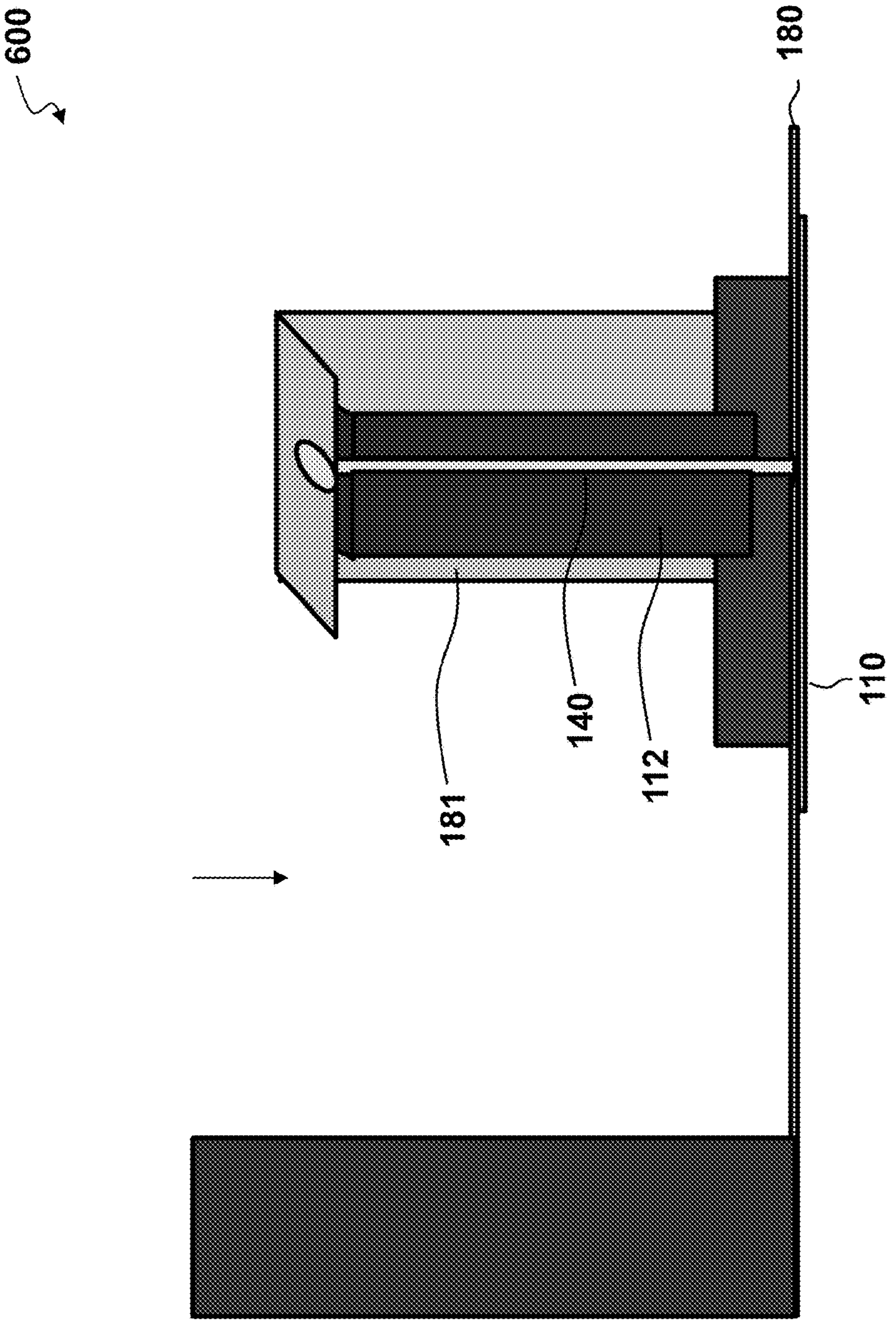
FIG. 6 is an inverted view of FIG. 5, according to an embodiment of the present disclosure.

FIG. 6 depicts an inverted view of FIG. 5 according to an embodiment of the present disclosure. System 600 provides a view of system 500 depicting a terminal end of a second set of adjustment screw 140 as viewed from the bottom of flange and base plate brackets 112, 181. This view illustrates how the second set of adjustment screw 140 may be affixed to the base plate bracket 181 providing a method of reducing or adjusting a height relative to a flange 110 surface.

Figure 7:
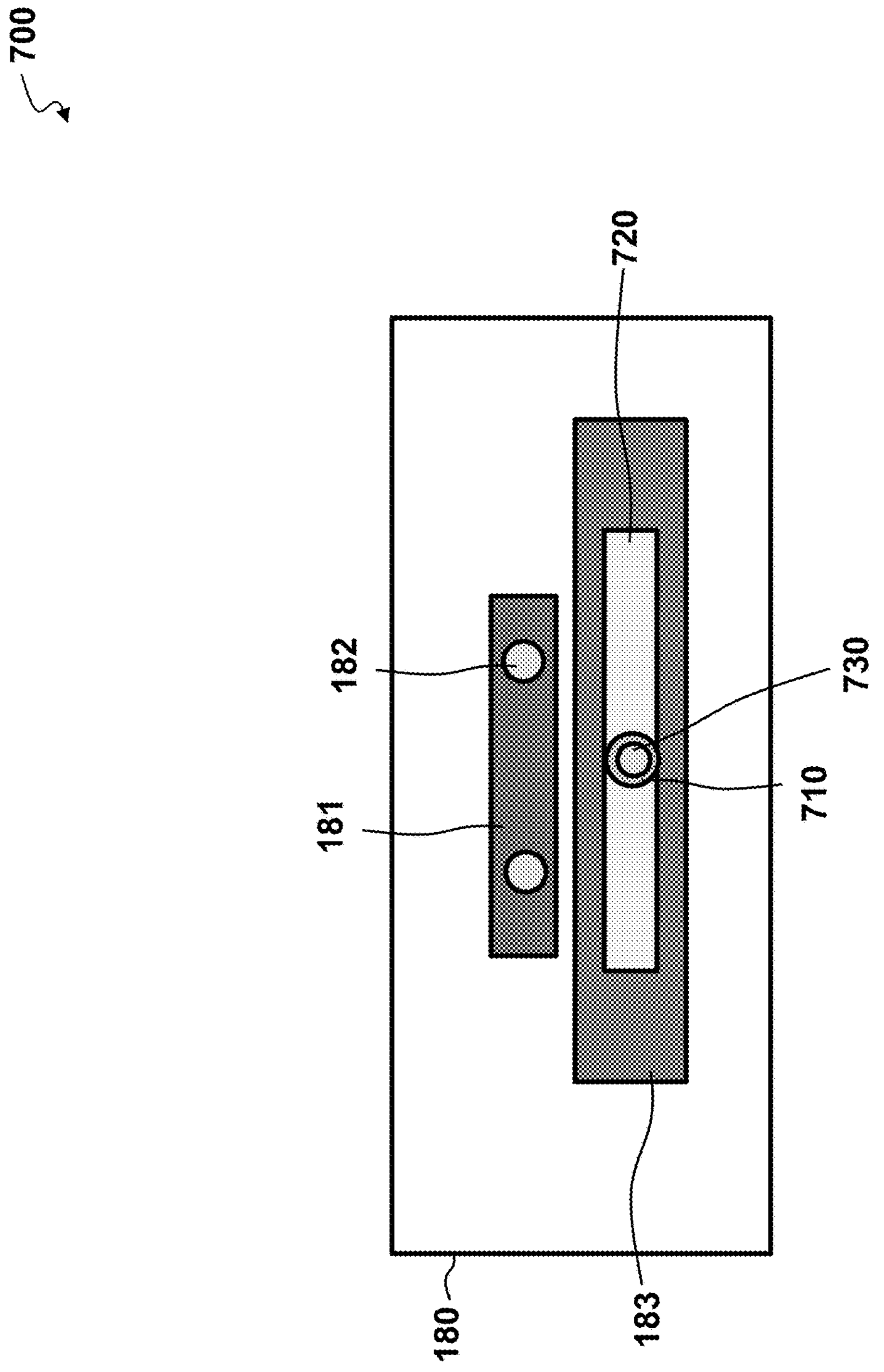
FIG. 7 depicts a top-side view of the base plate according to an embodiment of the present disclosure.

FIG. 7 depicts a top-side view 700 of base plate 180 of system 100 depicted in FIG. 1, according to an embodiment of the present disclosure. Top-side view system 700 may include base plate 180, base plate adjusting bracket 181, a bracket retainer 182, a base plate holding bracket 183 which defines a base plate holding bracket opening 710, and a flange holding bracket 720 defining a flange holding bracket opening 730. In this embodiment, there are two adjustments, where one is for the base and the other is for the flange. The base plate adjusting bracket 181 may be the adjusting arm for the base. The bracket retainer 182 may be the retaining clip for the adjustment. This could be a weld, a nut and bolt or some other means to attach the adjusting arm to the body. That is, the base plate holding bracket opening 710 and flange holding bracket opening 730 reflect the opening for the two screws to adjust as above. The base plate holding bracket 183 and the flange holding bracket 720 are illustrations of the retaining mechanisms for both of the adjusting arms. The result can be better visualized in FIG. 8 below.

Figure 8:
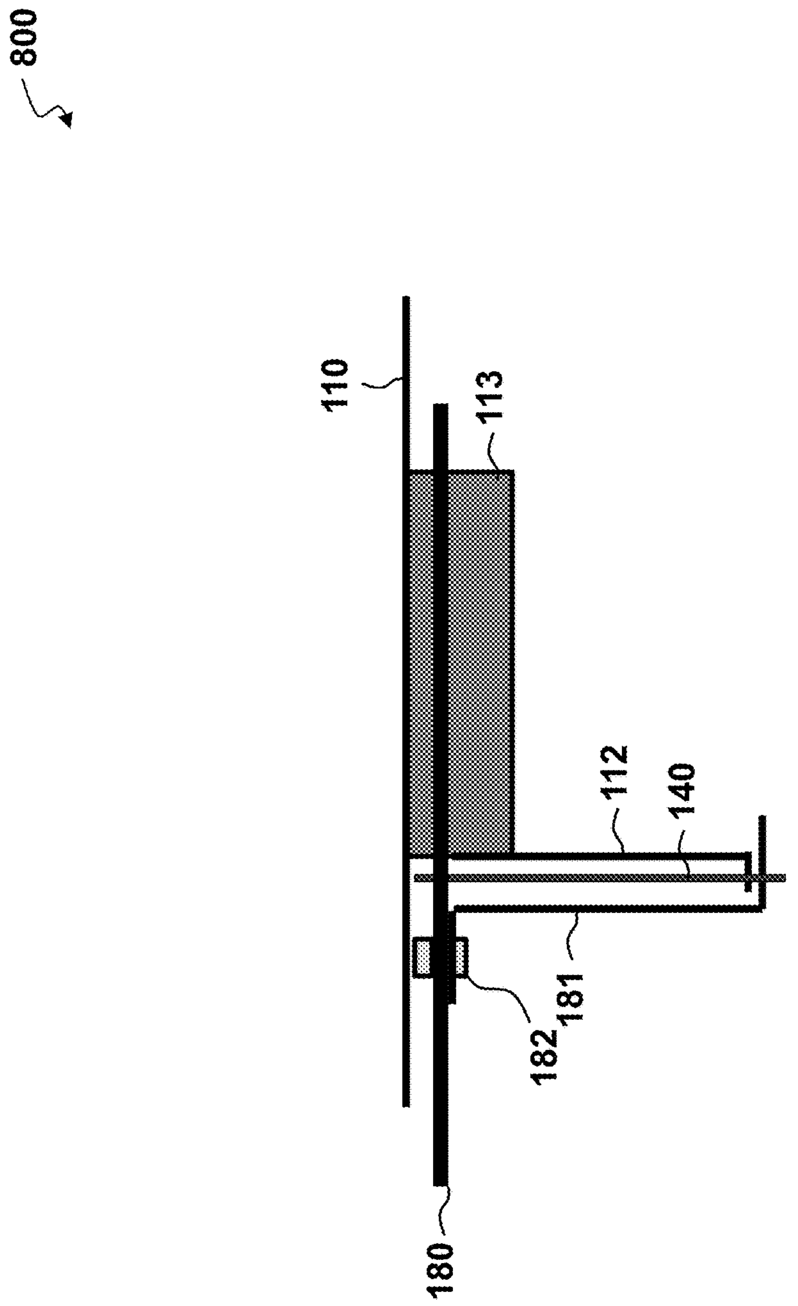
FIG. 8 depicts a side-view of the present system, according to an embodiment of the present disclosure.

FIG. 8 depicts a side-view 800 of the present system 100, according to an embodiment of the present disclosure. The depicted view of an embodiment of system 100 includes those components which facilitate the height adjustment of the flange 110 surface. Included in system 800 may be: base plate 180 which may attach to a base plate adjusting bracket 181 through bracket retainer 182 where 181 and 182 may be fixed components relative to a working surface, a baseplate adjusting bracket 181 which provides a structural base where the second set of adjustment screw 140 may screw into and to adjust a height difference between a base plate 180 and a flange 110 surface, and flange adjusting bracket 112 which may receive the second set of adjustment screws 140. In some embodiments, the base plate 180 may be attached to flange 110. The flange 110 may include a primary housing 113 where housed fixture electrical materials such as wires and other affixing components, for example may be kept. In one embodiment, all surfaces are moving and in other embodiments, one or more surfaces are not. In one embodiment, the flange surface 110 may be adjusted relative to a base plate 180, in another embodiment the flange 110 and base plate 180 may be attached to each other. That is, in some embodiments, all three parts, the flange, the lighting housing, the light, may be adjusted using the disclosed system.

Figure 9:
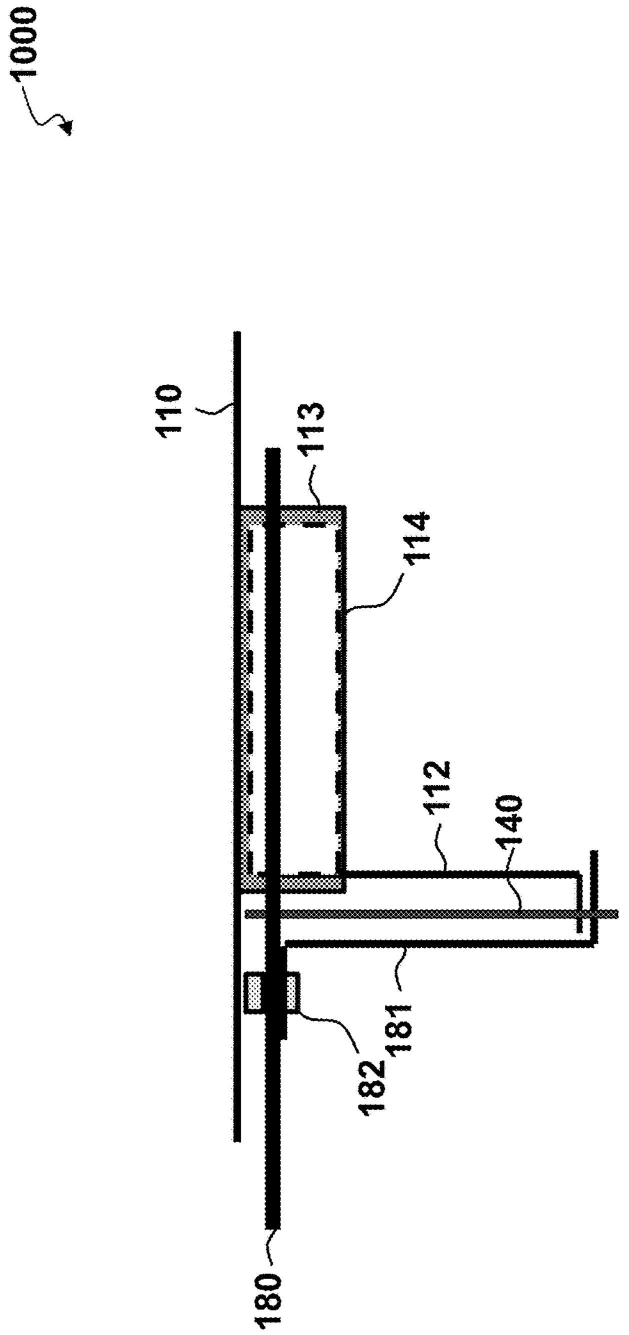
FIG. 9 depicts the system depicted in FIG. 8 with a compartment, according to an embodiment of the present disclosure.

FIG. 9 depicts the system of FIG. 8 with a component compartment 900, according to an embodiment of the present disclosure. the system 900 depicted in FIG. 9 additionally includes primary housing 113 depict in a transparent view where the housing 113 may include a lighting or other component compartment 114 within System 900 illustrates the functionality of system 100. For example, in a building or renovation environment where lighting fixtures may already be installed, a ceiling surface may require path work or other forms of maintenance which may result in a surface intended to be parallel or flush with flange 110 becomes extended so that flange 110 is recessed into the wall. A traditional recessed lighting fixture would be required to be removed and additional structures may be necessary to add in order to extend the fixture to a surface flush with a new layer. The disclosed embodiments eliminate the requirement for adding wood blocks or screwing fixture screws in new locations in order to accommodate a different height. That is, the present embodiments remove these adjustments by providing an adjustable system 100 which facilitates the adjustment of surfaces such as the flange 110. A user may, for example, simply adjust the second set of adjustment screw 140 which may in-turn adjust a height of a flange surface 110 as well as a lighting compartment 114 and housing 113.

Figure 10:
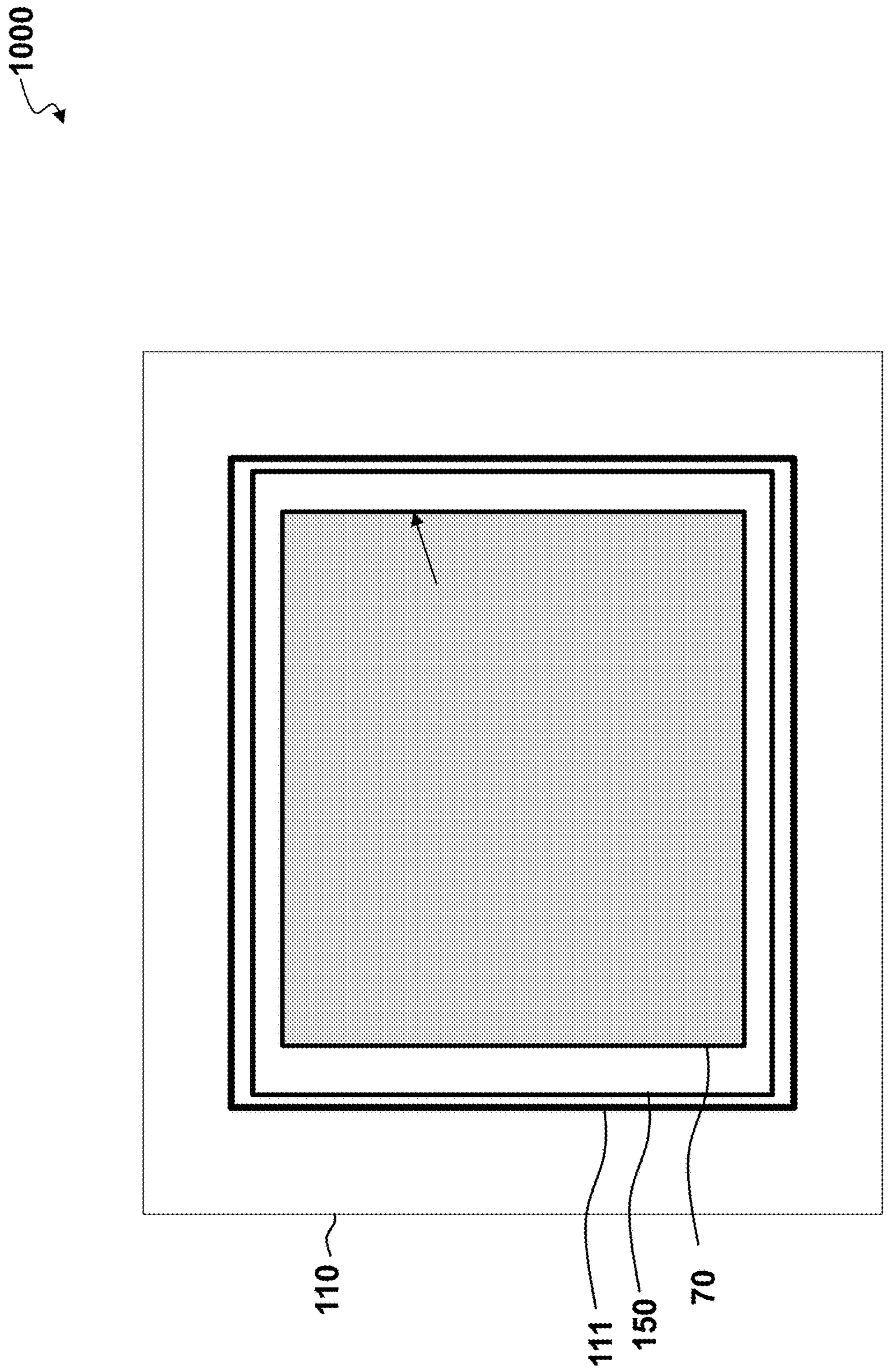
FIG. 10 is a component diagram of the present system, according to an embodiment of the present disclosure.

FIG. 10 is a component diagram 1000 of the present system 100, according to an embodiment of the present disclosure. System 1000 may include FIG. 1 components flange 110, flange inner wall 111, a lighting housing 150 which provides a compartment for light support components, and lighting 70. FIG. 10 illustrates an example of use of system 100 where, the housing assembly includes lighting 70. In a system such as 1000, a lighting 70 may be substantially flat, requiring fixtures to provide a stable structure to facilitate the lighting 70 surface with a working surface.

Figure 11A:
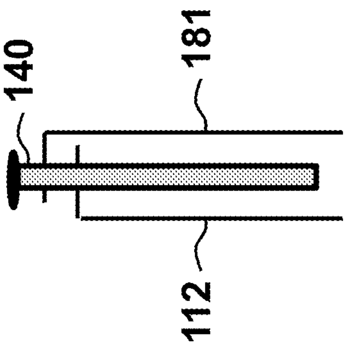
FIG. 11A depicts a side view of the adjustment mechanism according to an embodiment of the present disclosure.

FIG. 11A depicts a side-view of adjustment mechanism 1100, according to an embodiment of the present disclosure. The adjustment mechanism 1100 includes flange and base plate brackets 112, 181. Adjustment mechanism 1100 illustrates how second adjustment screw 140 may be inserted through both the flange and base plate brackets 112, 181 to facilitate adjustment of surfaces such as the flange 110 (not depicted).

Figure 11B:
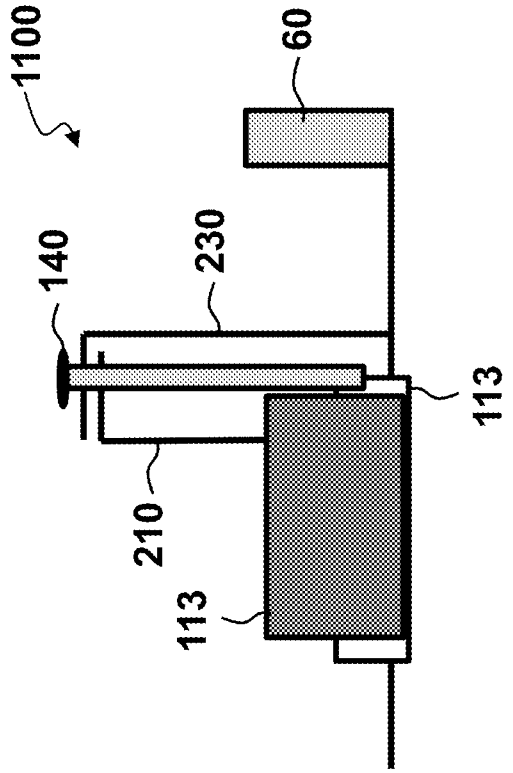
FIG. 11B depicts a side view of the present system with a mechanism adjusting bracket, according to an embodiment of the present disclosure.

FIG. 11B depicts a side view of the present system 100 with a component adjusting bracket 1100, according to an embodiment of the present disclosure. The system 1100 as depicted further includes a first adjusting bracket 210 and the second adjusting bracket 230 receiving adjustment mechanism 140, adjacent to housing 113, and power supply 60. The first adjusting bracket 210 may be a component adjustment bracket attached to component 70, where a component 70 may be a variety of equipment such as electrical fixtures, lighting, outlets, and the like. Component 70 may further be housed in a primary housing 113. The second adjusting bracket 230 may be a body adjustment bracket, where a body includes a portion which includes housing 113 and second adjustment bracket 230. The present system 1100 may also include an external power supply 60 which may provide a housing for external wires to supply power to required systems.

Figure 11C:
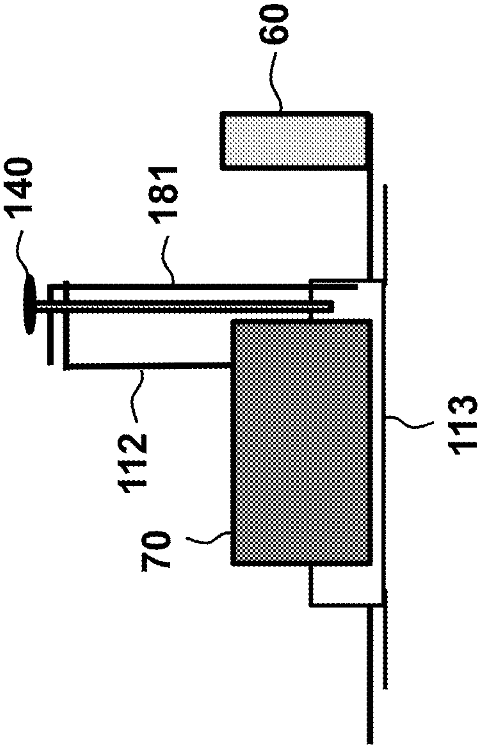
FIG. 11C depicts a side view of the present system with a flange adjusting bracket, according to an embodiment of the present disclosure.

FIG. 11C depicts a side view of the present system 1100 with a flange adjusting bracket, according to an embodiment of the present disclosure. The present system 110 may further include a system similarly depicted in FIG. 11B and may also include a flange and base plate adjusting brackets 112 and 181 where being a flange adjusting bracket 112 may be inside or outside the housing 113. Further included is a component 70 and power supply 60 configured to provide encasement of external wiring and power supply to system 1100.

Figure 11D:
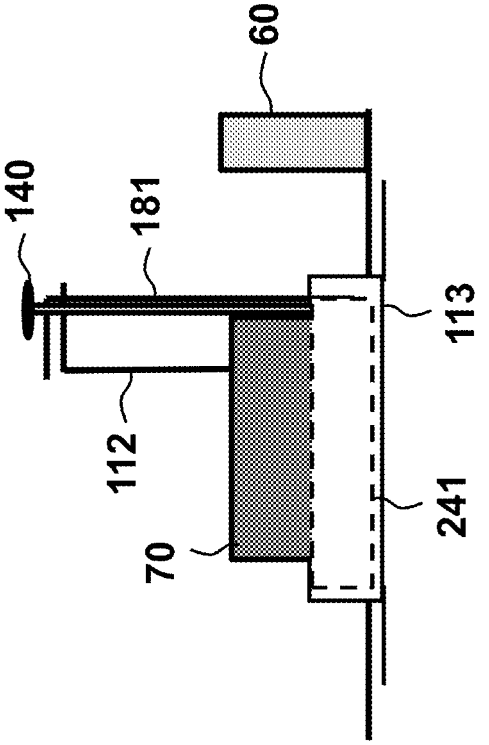
FIG. 11D depicts a side view of the present system with a component housing adjusting bracket, according to an embodiment of the present disclosure.

FIG. 11D depicts a side view of the present system with a component housing adjusting bracket, according to an embodiment of the present disclosure. The present system 1100 depicted includes components depicted in FIG. 11A while further depicting the flange adjustment bracket 112 attached to a component base plate adjusting bracket 181 and a housing 113 including a component housing 241.

Embodiments depicted in FIGS. 11B, 11C, and 11D illustrate how the adjustment system 100 provides various requirements such as those which my require a flange 110 or those that may not are compatible with the current system 100.

Figure 12B:
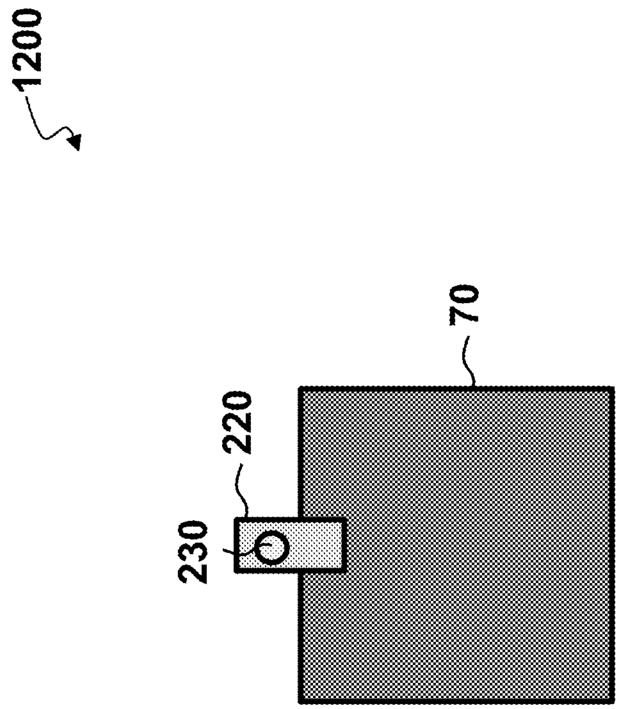
FIG. 12B depicts component being attached to a bracket, according to an embodiment of the present disclosure.
Figure 12A:
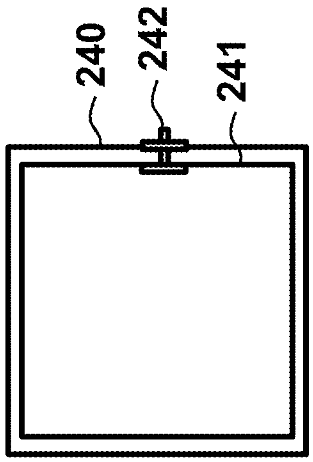
FIG. 12A depicts a modular component housing, according to an embodiment of the present disclosure.

FIG. 12A depicts a modular component housing 1200, according to an embodiment of the present disclosure. The modular component housing 1200 may include a component housing 241 used to provide and enclosure for desired components such as lighting fixtures, which may be attached to the primary housing 240 using a secondary attachment fastener 242. There can be effectively 3 walls in the described embodiments, the component housing, in this case, is the light, the primary housing may be a separate housing for just the light or it could be the flange body housing. (113, FIG. 8).

The modular component housing 1200 provides a method of installing components of the current system 100 is parts. For example, system 100 may include an adjustment mechanism as depicted in FIG. 11A but one may have particular components 70 which require specific dimensions. In this scenario, one would be able to remove the modular component housing 1200 without removing the entire system 100. In some embodiments, housing 1200 may include body shapes such as circular, rectangular, oblong, etc.

FIG. 12B depicts a component attached to a bracket, according to an embodiment of the present disclosure. The component 70 may be attached to a second adjusting bracket 220 through an adjustment mechanism 230. In one embodiment, the component may be attached where the component 70 is the light, the second adjusting bracket 220 is the bracket attached to the light, and the adjustment mechanism 230 is the screw access hole. This is the part that could have 3 adjustments.

In another embodiment, a component may be substantially circular shaped or square shaped where adjustment screws may be inserted through a surface of the component and attach to an adjustment bracket 220 being adjusted using an adjustment mechanism 230. For example, a component embodiment may be provided such as one to accommodate a lighting fixture, where the lighting fixture may be circular in shape, and where an adjustment screw may be used to adjust the component. Accordingly, the component and lighting fixture may be configured to have adjusted height so that the lighting fixture may be substantially flush with a working surface.

Figure 13A:
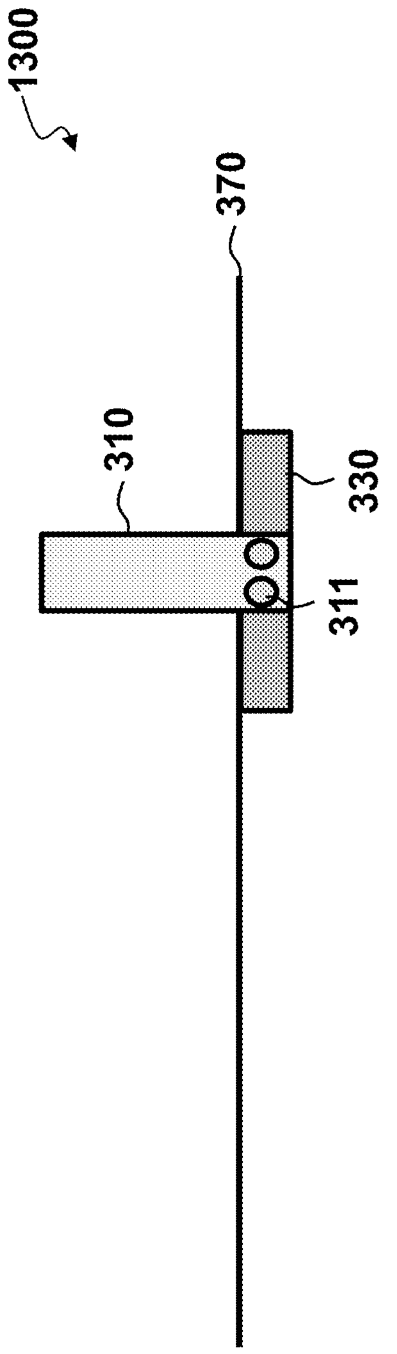
FIG. 13A depicts a bracket being attached to a spacer, according to an embodiment of the present disclosure.

FIG. 13A depicts a bracket of system 1300 being attached to a spacer, according to an embodiment of the present disclosure. System 1300 includes a bracket 310 which may include brackets as depicted in FIGS. 1 (112, 181), a spacer 330 which may attach to bracket 310, and a base plate 370 via bracket fasteners 311. For example, the light wall may be slanted into the light housing and in order to attach the adjusting mechanism, the spacer may be needed to get the adjusting bracket outside of the light base.

Figure 13B:
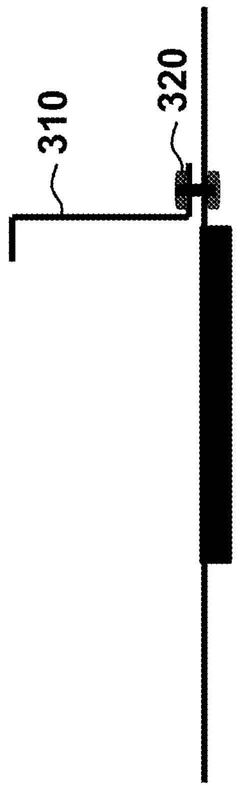
FIG. 13B depicts a side view of the bracket depicted in FIG. 13A, according to an embodiment of the present disclosure.

FIG. 13B depicts a side view of the bracket depicted in FIG. 13A, according to an embodiment of the present disclosure. Accordingly, because the base has no place to put the adjusting bracket, it is needed to be physically attached to the base via, for example, elements 310 and 320.

Figure 14:
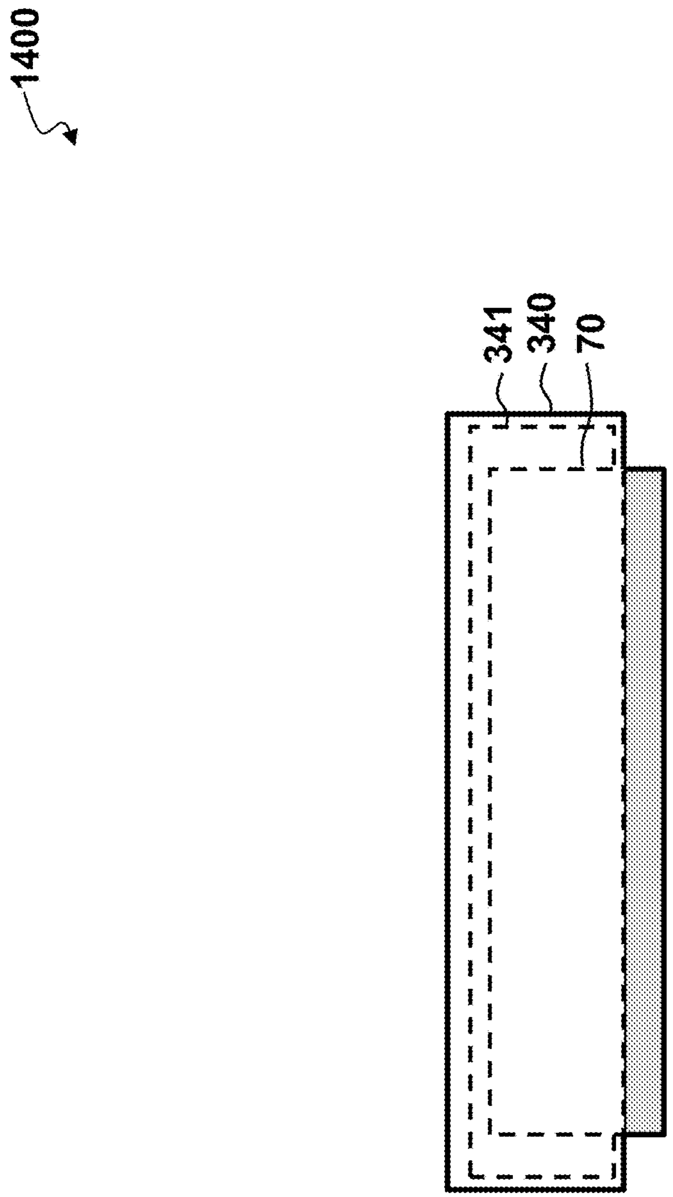
FIG. 14 depicts a primary housing with a component housing, according to an embodiment of the present disclosure.

FIG. 14 depicts a primary housing with a component housing 1400, according to an embodiment of the present disclosure. The system 1400 includes primary housing 340 which may provide structure to a component housing 341 and component 70. The system 1400 illustrates how separate components 70 may be integrated into system 100 or other embodiments such as a modular one depicted in 12A. System 1400 further illustrates how the component housing 341, primary housing 340, and component 70, may organize in an assembled configuration.

Figures 15A, 15B, 15C:
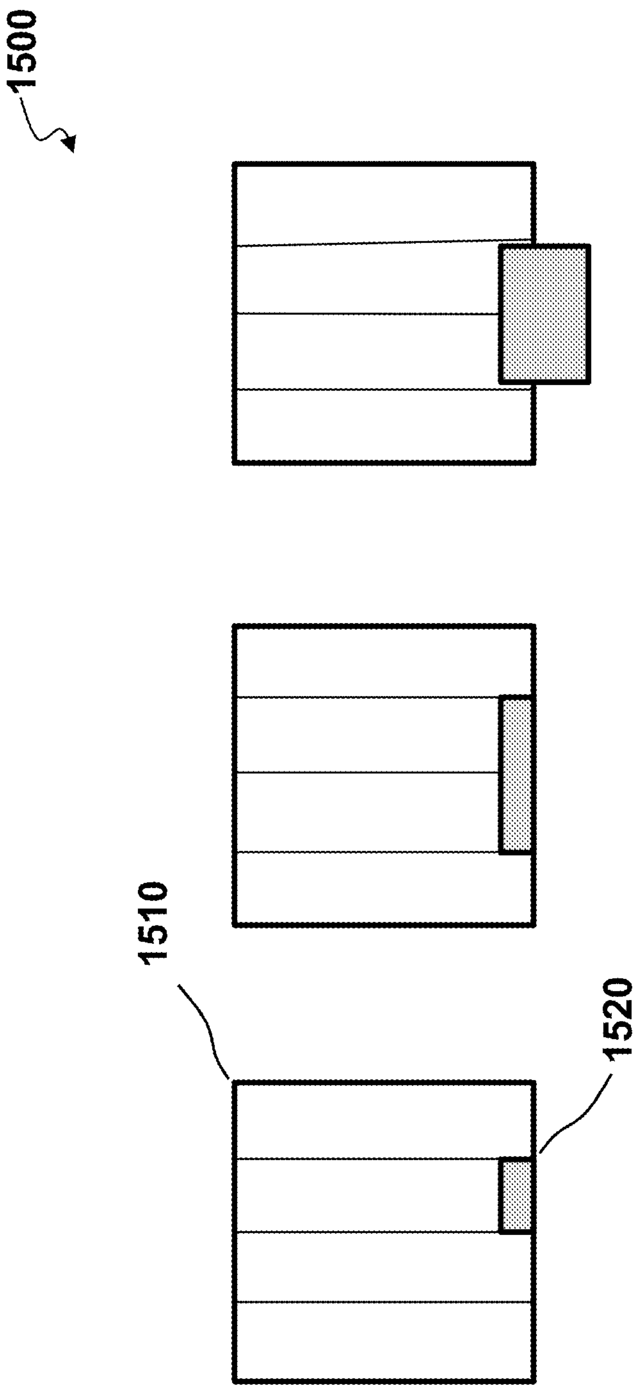
FIG. 15A depicts a top-side view of a mounting bracket, according to an embodiment of the present disclosure.
FIG. 15B depicts a top-side view of an alternative mounting bracket, according to an embodiment of the present disclosure.
FIG. 15C depicts a top-side view of another alternative mounting bracket, according to an embodiment of the present disclosure.

FIG. 15A depicts a top-side view of a mounting bracket 1500, according to an embodiment of the present disclosure. System 1500 provides several views of a mounting bracket 1510 from various views. Accordingly, FIG. 15A depicts a top-side view of an alternative mounting bracket 1510, according to an embodiment of the present disclosure. FIG. 15C depicts a top-side view of another alternative mounting bracket 1510, according to an embodiment of the present disclosure. In this example, the light in this product has cooling fins. The vertical represents the fins. The blue blocks reflect the attachment bracket base attached to the fins.

Figure 16:
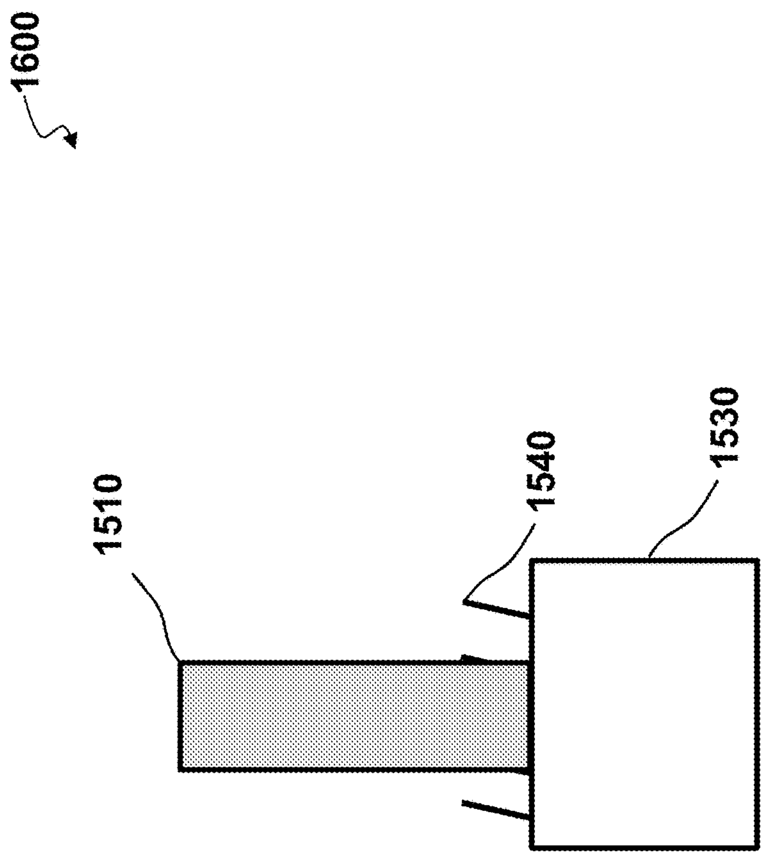
FIG. 16 depicts a side view of the mounting bracket, according to an embodiment of the present disclosure.

FIG. 16 depicts a side view of the mounting bracket 1510 of FIG. 15A-C, according to an embodiment of the present disclosure. Elements 1530 and 1540 reflect the side view of the descending bracket in FIG. 15.

Figure 17:
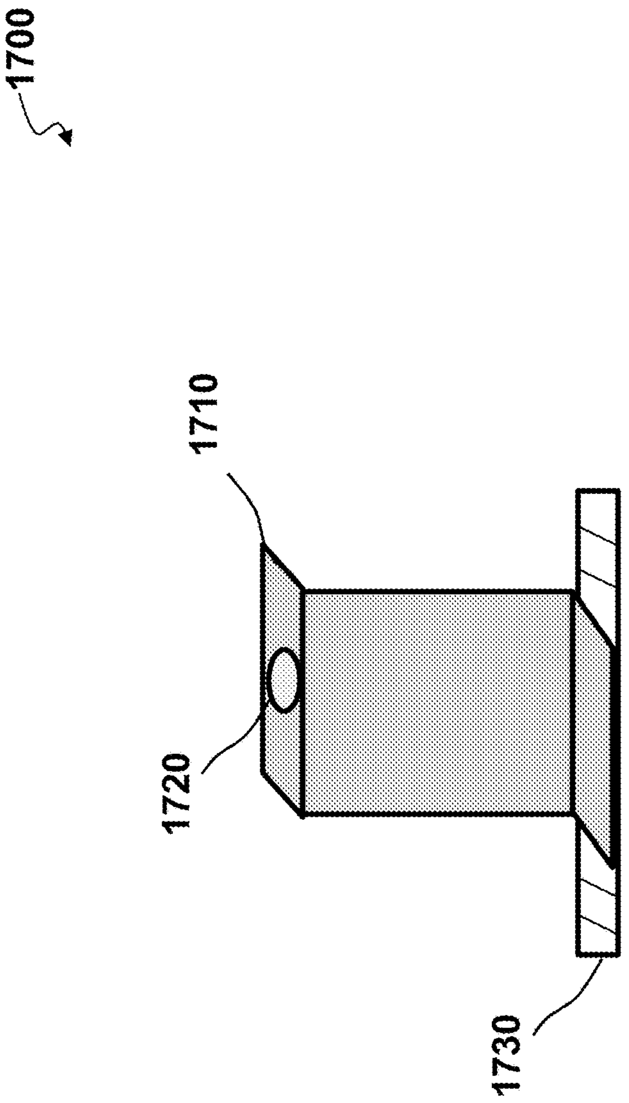
FIG. 17 depicts a perspective view of the mounting bracket, according to an embodiment of the present disclosure.

FIG. 17 depicts a perspective view of the mounting bracket of FIGS. 15 A-C, according to an embodiment of the present disclosure. This figure depicts an example of the bracket which shows the attachment direction (1710 to the light) 1720, the screw insertion hole and 1730 the light base.

Figure 18:
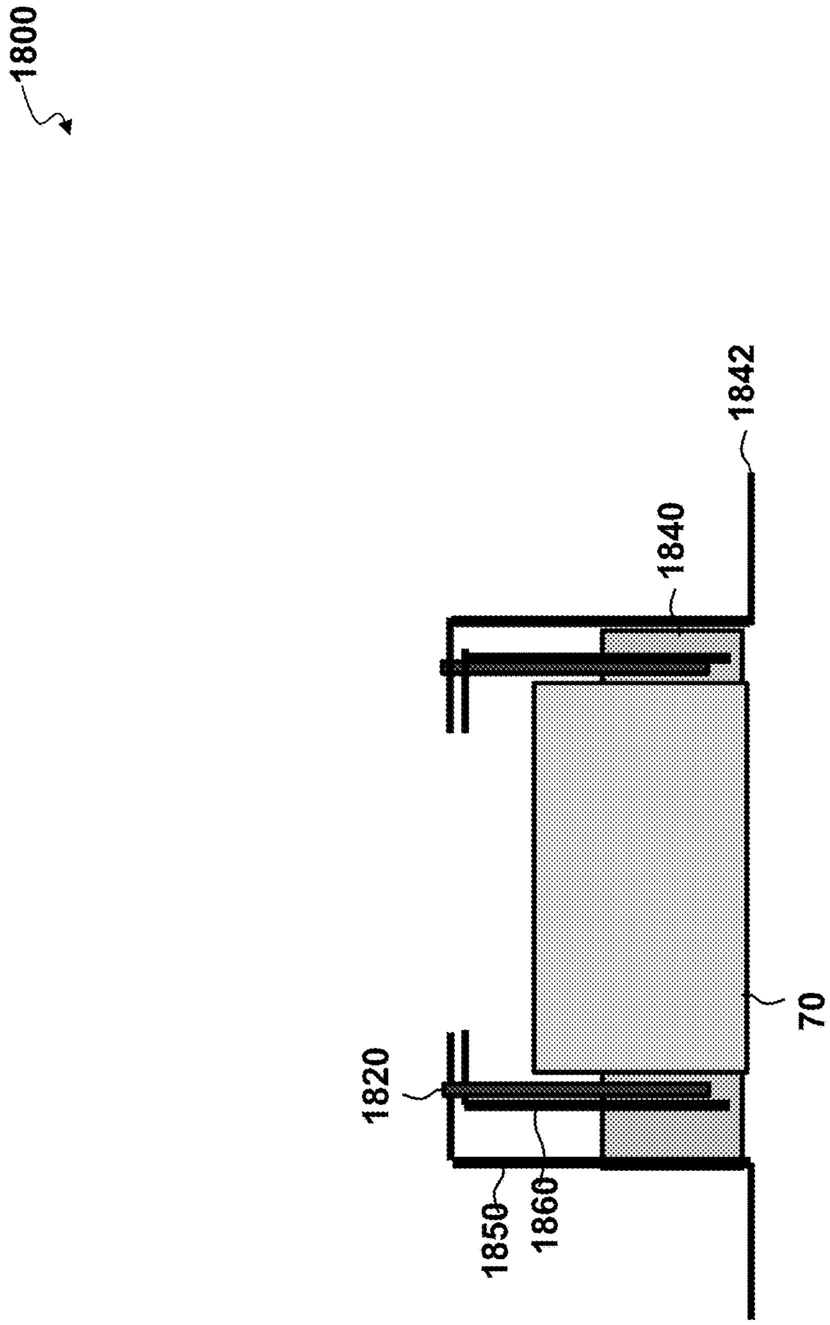
FIG. 18 depicts a side view of the present system, according to an embodiment of the present disclosure.

FIG. 18 depicts a side view of the present system 1800, according to an embodiment of the present disclosure. The present system 1800 may include a first adjusting bracket 1850 and a second adjusting bracket 1860 where both brackets 1850 and 1860 may receive an adjustment mechanism 1820 and are configured to raise and lower via the adjustment mechanism 1820, a primary housing 1840 holding a component 70, which may be attached to the second adjusting bracket 1860 (also see FIG. 19, ref. no. 360) and may also be raised and lowered according to adjustments made by the adjustment mechanism via adjustment brackets 1850 and 1860. System 1800 also includes a flange extension 1842 which may be configured to be substantially level with a working surface. In this embodiment, the adjustment mechanism 1820 would raise the light, the second adjusting bracket 1860 would raise the flange housing, and the first adjusting bracket 1850 would raise them both.

Figure 19:
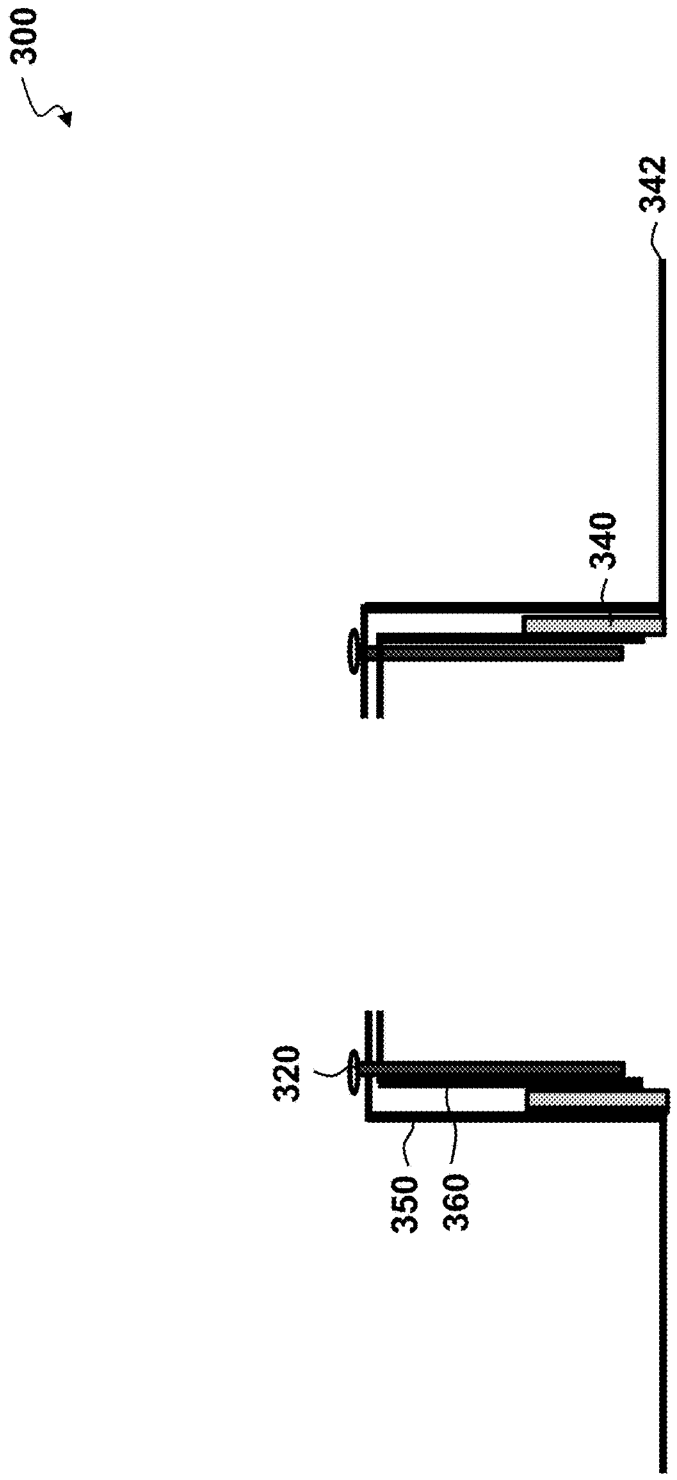
FIG. 19 depicts a side view of FIG. 18 without component, according to an embodiment of the present disclosure.

FIG. 19 depicts a side view of FIG. 18 without a component, according to an embodiment of the present disclosure. This illustration shows how the three adjustments would work together, e.g., how they were attached. That is, the fastener 320 would have the adjusting bracket attached to the inner component, the second adjusting bracket 360 would be attached to the inner component housing, and 350 would be attached to the flange housing.

Figure 20:
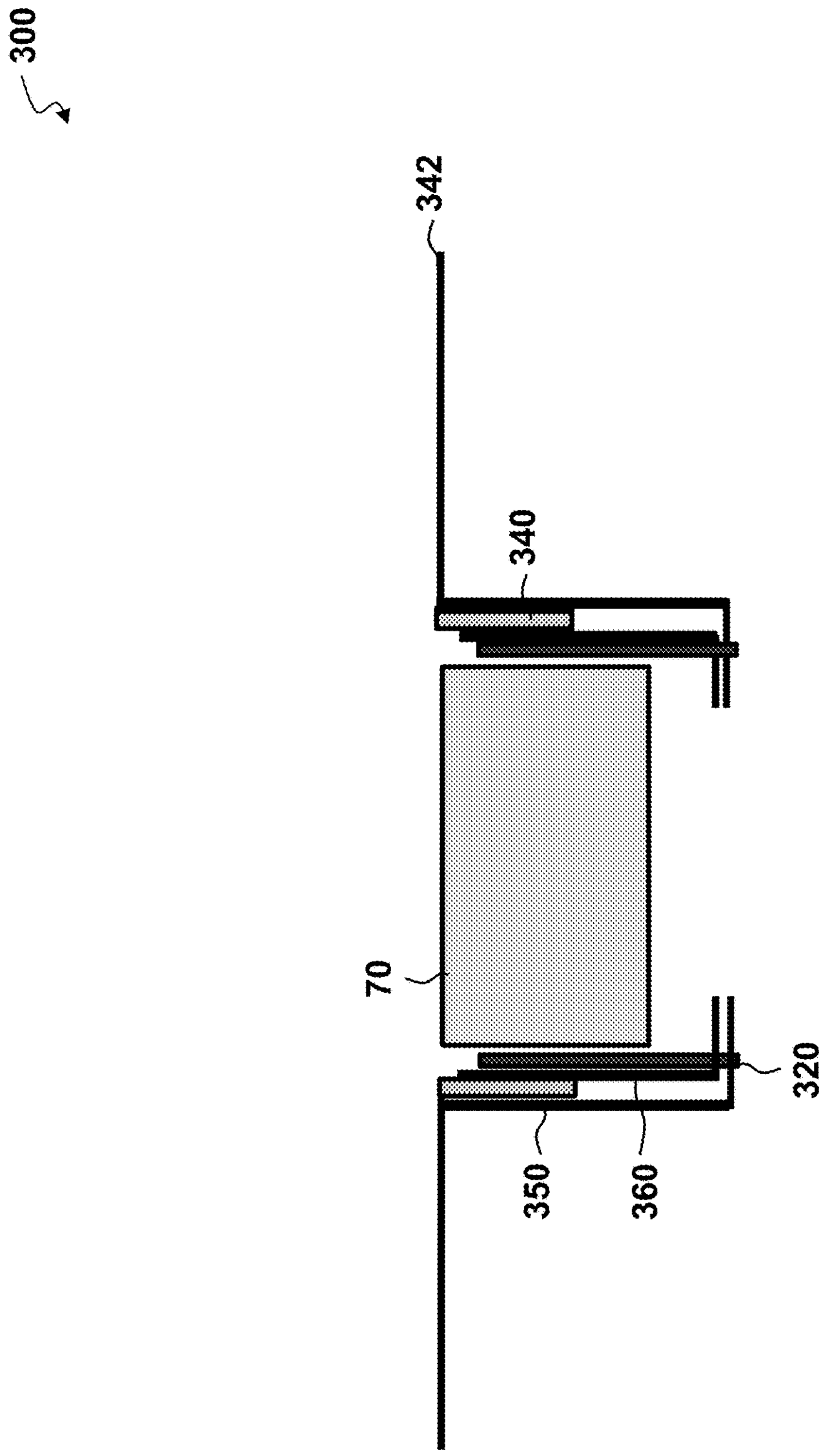
FIG. 20 depicts a reverse view of FIG. 19 with component, according to an embodiment of the present disclosure.

FIG. 20 depicts a reverse view of FIG. 19 with component, according to an embodiment of the present disclosure.

Figure 21:
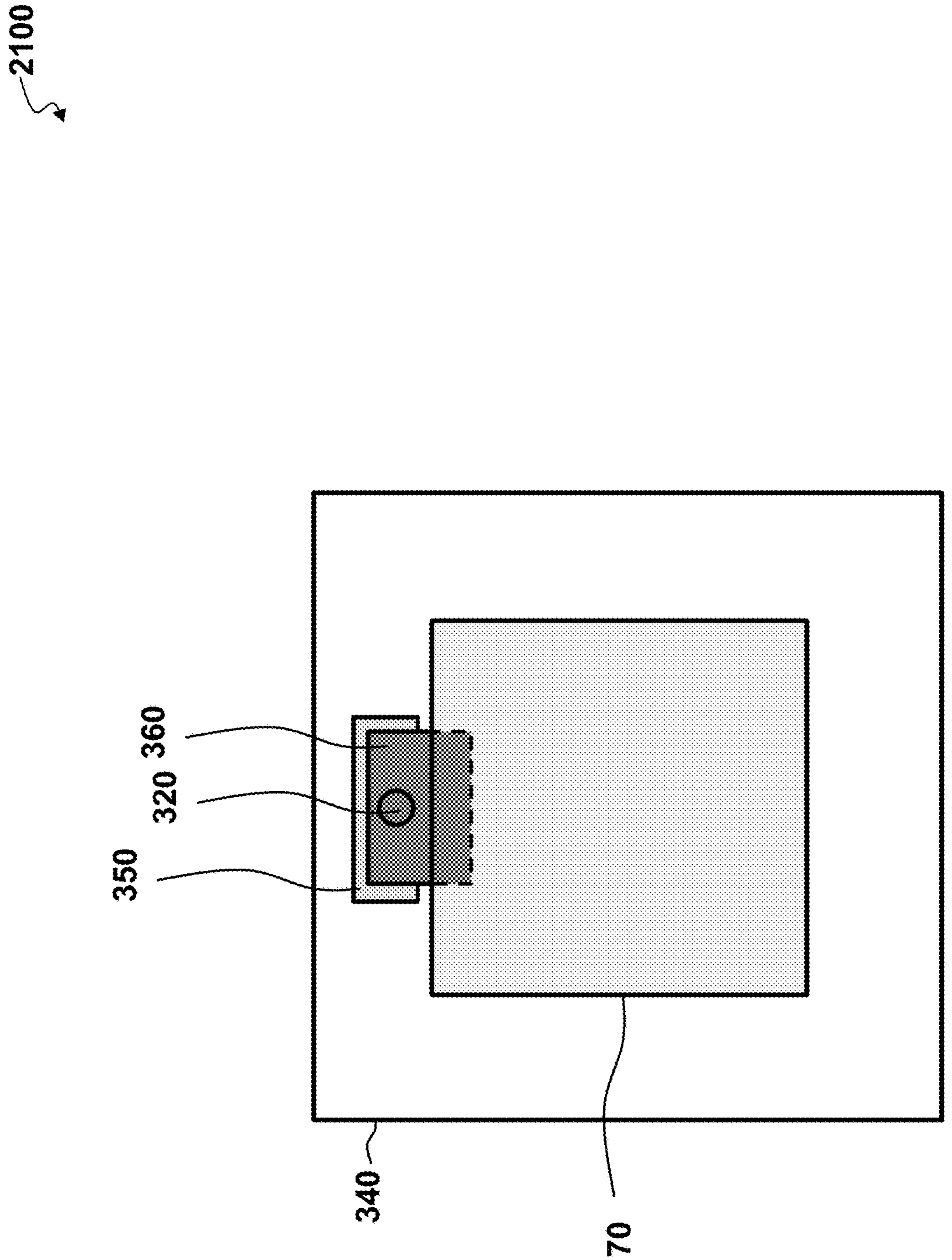
FIG. 21 depicts a bottom side view of the present system while attached to a mounting surface, according to an embodiment of the disclosure.

FIG. 21 depicts a bottom side view of FIG. 18 while attached to a component, according to an embodiment of the disclosure. As this is a top view of FIG. 19, it is reflecting the 3 adjusting screws.

Systems as described may depicts an embodiment of the present system including flange which may be configured to affix system to a working surface, adjustment screw attached to a bracket and configured to adjust a height of the bracket relative to the flange, upper tab which provides a component housing securing point, flange tab which is attached to flange, and bracket tab attached to bracket and which may further be configured to adjust an attached component housing.

In one embodiment, flange may include a configuration which requires system to be rotated onto preexisting screws to secure the system to a working surface, while in other embodiments, the screws which pass through the flange and the working surface may be included.

In other embodiments, system may include a bracket which is substantially circular to accommodate components and primary housings which hold equipment which requires a circular house, while in other embodiments, the bracket may have a square or parallelogram type shape In yet another embodiment, adjustment screw may be configured with a flat end which is configured to preclude removal from tabs and. In other embodiments, tab may be configured to provide clearance at a working surface flush with flange.

For example, under circumstances where a housing is attached to a bracket, such as a lighting fixture, may be desirable for the lighting fixture to be presented as flush with a working surface. In this case, installation would include adjusting adjustment screw so that the lighting fixture is flush while tabs may not impede or be visible at a working surface flush with flange.

In another system embodiment without adjustment brackets, the system may include components further including a flange, a push clip, housing, and a tab. According to one embodiment, the system may include four tabs which may be used to secure a primary housing. In another example, a primary housing may be removable, where the system may further include a flange, where a removable primary housing may be installed into a flange housing. In some embodiments, primary housing may further be configured to be height adjusted via adjustment brackets.

In some embodiments, adjustment brackets may provide a flange clearance height which may accommodate primary housing. For example, when primary housing is installed into flange housing, adjustment components such as adjustment screws and brackets, may be configured in a recessed manner to provide space for primary housing.

Figure 22:
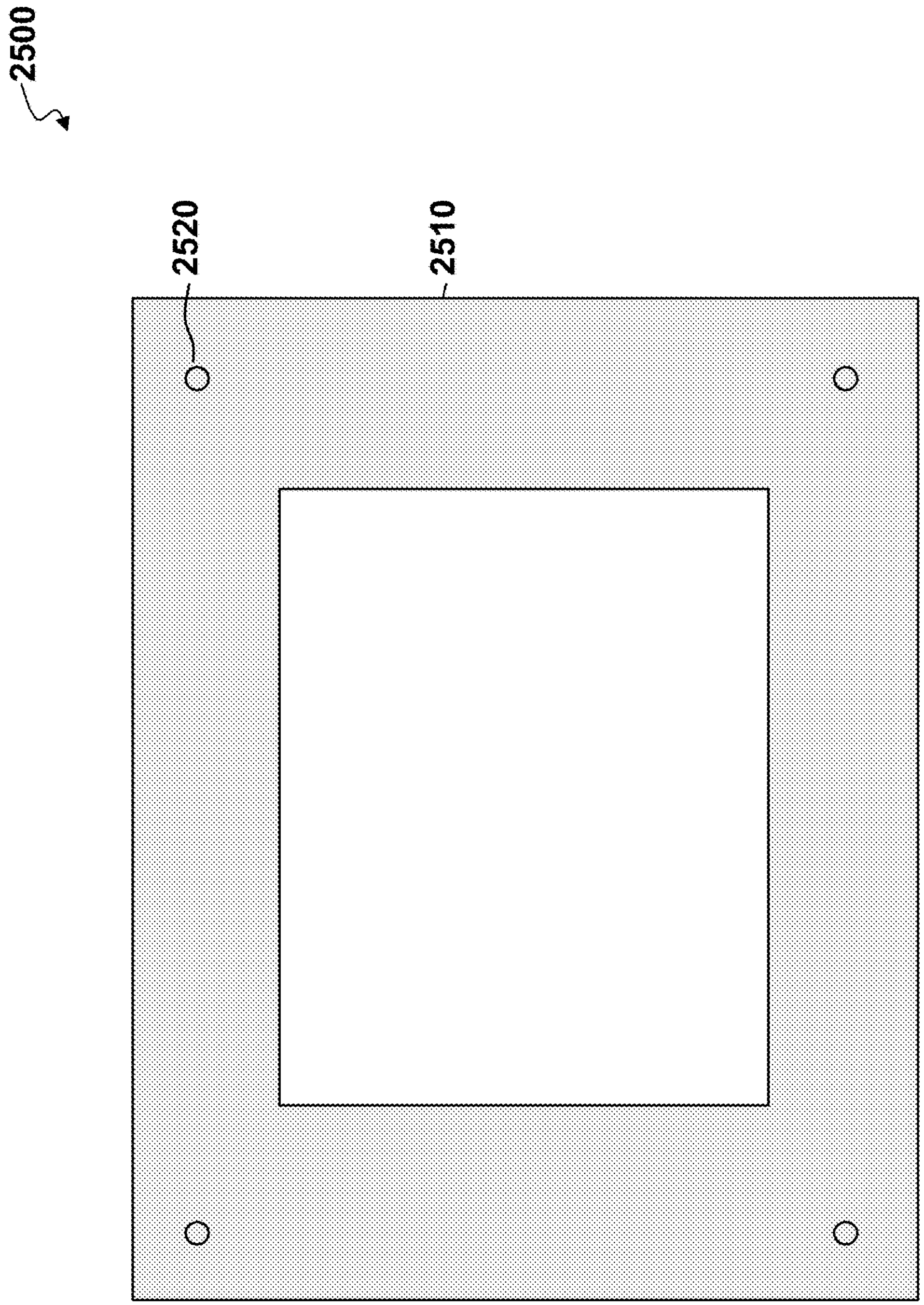
FIG. 22 depicts the adjustment system with a first attachable piece flange, according to an embodiment of the disclosure.

FIG. 22 depicts an adjustment system with a first attachable piece flange 2500, according to an embodiment of the disclosure. System 2500 depicts an embodiment of the present system 100, where a first attachable piece flange 2510 provides a detachable base for system 100 including plate holes 120 provide securing points for the flange to be secured to a working surface. System 2500 provides an embodiment where system 100 may include interchangeable attachments which may further allow the system to be customizable according to the needs of a working area.

In some embodiments, attachments to flange 2510 may press fit into an inner area, while in other embodiments, attachments may clip on to the flange. Other securing methods, such as additional screw points are also contemplated.

Figure 23:
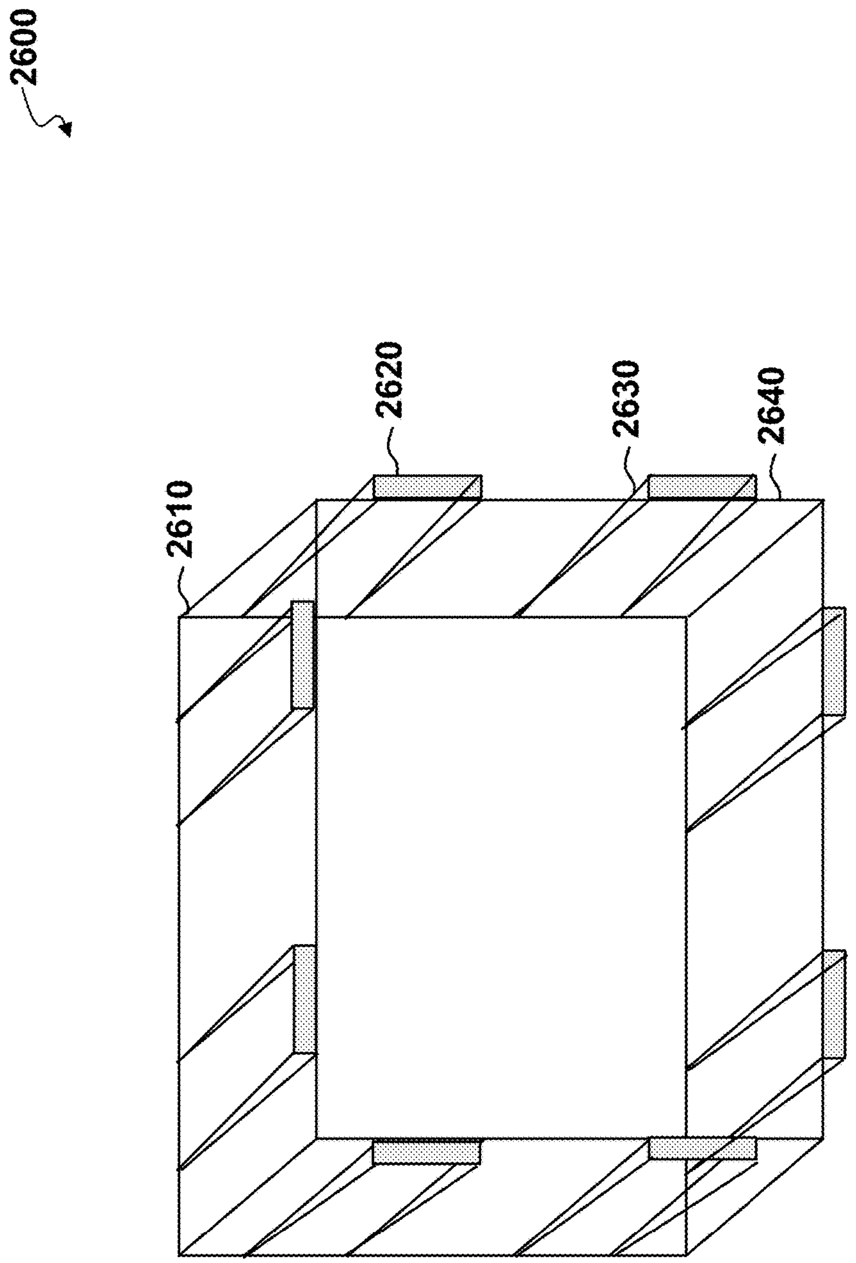
FIG. 23 depicts the adjustment system with a second attachable piece component housing, according to an embodiment of the disclosure.

FIG. 23 depicts the system of FIG. 25 with a second attachable piece component housing 2600, according to an embodiment of the disclosure. System 2600 may include an attachable component housing 2610, which may be attachable to flange 2510 of FIG. 25, flange clip 2620 which may clip onto flange 2510 using flexible clip components 2630 which when depressed, provide lip which prevents the removal of attachable piece component housing 2610 from flange 2510.

For example, in some embodiments, flange 2510 may fit around and slide over the edges 2640 of housing 2610, where flange clips 2620 may provide increasing resistance as the flange 2510 as it continues to an edge 2640 until clips 2620 snap into an original deflection angle locking flange 2510 in place.

Removal of flange 2510 may include the reversal of an installation sequence including, in some embodiments, where flange clip 2620 may be depressed to a deflection angle where clips 2620 are flush with edges 2640. Flange 2510 may be released by the clips 2620 and may at that point be slidable in a direction away from edges 2640 and detached from housing 2610.

In one embodiment, adjustment screws and screw holes may be included in housing 2610 on a surface normal to edges 2640. This embodiment allows the attachable housing 2610 to provide adjustment components further adding functionality to the attachable piece. For example, after housing 2610 is clipped and attached to flange 2510, additional adjustment mechanisms may use adjustment holes to further secure, for example adjustment brackets using adjustment screws.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system for electric device installation comprising:

a primary housing, wherein the primary housing is used for installation of the electric device;

a first adjusting bracket attached to the primary housing for mounting to the primary housing, wherein the first adjusting bracket comprises a set of two or more screw holes to receive at least two screws for height adjustment;

a second adjusting bracket connected to the first adjusting bracket, wherein the second adjusting bracket comprises a set of two or more screw holes to receive at least two screws for height adjustment;

an adjustment mechanism, wherein the adjustment mechanism comprises a set of two or more adjustment screws, wherein at least two screw of the set of two or more screws are inserted into both the first adjusting bracket screw holes and the second adjusting bracket screw holes; and wherein overall height of the system relative to a mounting surface is adjusted via turning at least one screw of the two or more adjustment screws thereby moving the second adjusting bracket relative to the first adjusting bracket.

2. The system of claim 1 wherein the primary housing comprises:

an electrical component housing.

3. The system of claim 2, wherein the electrical component housing is detachable from the primary housing.

4. The system of claim 1, wherein the second adjusting bracket is a housing adjusting bracket.

5. The system of claim 1, wherein the second adjusting bracket is a component adjustment bracket.

6. The system of claim 1, wherein the second adjusting bracket comprises a flange.

7. The system of claim 6, wherein the flange is recessed into a wall, wherein the flange provides a parallel plane to the mounting surface.

8. The system of claim 1, wherein the system further comprises:

an auxiliary bracket.

9. The system of claim 1, wherein the set of one or more screw holes are configured to receive the set of one or more adjustment screws.

10. The system of claim 1, wherein the system is configured to raise and lower via the adjustment mechanism.

11. The system of claim 1, wherein the system further comprises:

at least one mounting bracket wherein the at least one mounting bracket is placed within the primary housing.

12. The system of claim 1, wherein the system further comprises:

an external power supply.

13. The system of claim 1, wherein the system further comprises:

an electrical component disposed within the primary housing for providing electricity to the electric device.

14. The system of claim 1, wherein the adjustment mechanism is configured to make the system elevated or lowered such that the outer edge of the system is made substantially flush with the mounting surface.

15. The system of claim 1, wherein uneven adjustment of the set of two or more adjustment screws provides different height adjustments.

* * * * *